United States Patent Office 3,271,364
Patented Sept. 6, 1966

3,271,364
PROCESS OF PREPARING POLYCARBONATES
André Jan Conix, Antwerp, and Leonard Marie Dohmen, Berchem-Antwerp, Belgium, assignors to Gevaert Photo-Producten N.V., Mortsel, Belgium, a Belgian company
No Drawing. Filed Aug. 27, 1962, Ser. No. 219,743
Claims priority, application Great Britain, Aug. 29, 1961, 31,147/61
4 Claims. (Cl. 260—47)

This invention relates to polycarbonates and to the production thereof.

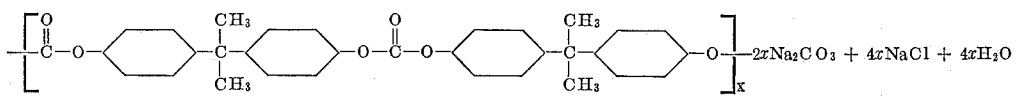

It is known to prepare polycarbonates by polycondensing aromatic dihydroxy compounds and phosgene. In this polycondensation bischloroformates of the aromatic dihydroxy compounds can be used instead of phosgene which is a gas and moreover which is extremely poisonous.

High molecular weight and colourless polycarbonates can be prepared by reacting diphenols or alkali metal diphenates with bischloroformates of diphenols. It is, however, necessary to purify the starting materials to as high a degree as possible. Although this can be done easily in the case of the bischloroformates which can be purified by distillation, it cannot be done easily in the case of the diphenols or diphenates.

In order to prepare high-molecular polycarbonates, one should work with stoichiometric quantities of diphenols and of dichloroformates of diphenols as much as possible. An excess of one of the reactants always lowers the attainable molecular weight of the polycarbonates.

The present invention relates to a process wherein a polycarbonate is prepared which comprises reacting a dihalogenoformate of a diphenol with an alkali hydroxide. It will be understood that more than one diphenyl halogenoformate and more than one alkali hydroxide can be used in the process.

From the description of various embodiments of the invention which will hereafter be given it will be apparent that the invention can be applied for the production of colourless high molecular weight polycarbonates. Furthermore, in some cases the polycarbonates prepared according to the present invention possess much higher molecular weight than previously described.

As dihalogenoformate it is preferred to use a dichloroformate and the invention will hereinafter be described with reference thereto.

The invention is preferably performed using a diphenol or diphenols with two phenylene rings.

It is preferred to carry out the process according to the invention by mixing the dichloroformate with an alkali hydroxide with thorough stirring. The dichloroformate of the diphenol, may be added as such or as a solution or dispersion. Furthermore it is recommended to add the alkali hydroxide to the dichloroformate. During polycondensation sodium carbonate, sodium chloride and water are formed.

The addition of an alkali metal hydroxide to the dichloroformates of diphenols can suitably occur at room temperature but can also suitably occur at higher temperatures which normally accelerate the reaction.

Very high-molecular weights are obtained when the molar ratio of the total amount of added alkali hydroxide and of the amount of dichloroformate of diphenol is 4:1.

The reaction between 1 mol of bischloroformate of 2,2-bis(4-hydroxyphenyl)-propane and 4 mols of sodium hydroxide can be represented as follows:

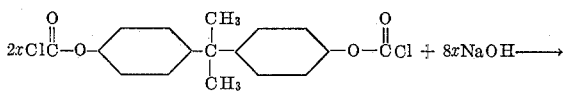

The polymer chains of the obtained polycarbonates may bear as terminal groups the following groups: —O—CO—Cl, —O—Na and —OH.

As alkali metal hydroxide which can be used in the reaction, sodium hydroxide first comes into consideration although potassium hydroxide gives also quite satisfactory results.

As diphenols which can be used in the reaction, compounds come into consideration corresponding to the general formula:

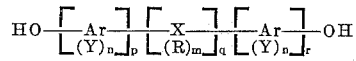

wherein:
Ar represents an aromatic nucleus or nuclei (e.g., a phenylene nucleus, a bisphenylene nucleus, or a naphthylene nucleus);
X represents an alkylene group or groups (e.g., a methylene group, an ethylene group or a propylene group); and/or an alkylidene group or groups (e.g., an ethylidene group, a propylidene group or an isopropylidene group); and/or two or more groups selected from alkylene and alkylidene bonded together by one or more of the following: an aromatic radical, a tertiary amino radical (—N(alk)—), a cycloaliphatic group or groups, a carbon atom or atoms forming part of a cycloaliphatic ring, an ether radical (—O—), a carbonyl radical (—CO—), or a radical containing sulphur (e.g., a sulphide radical (—S—), a sulphoxide radical (—SO—) or a sulphonyl radical (—SO$_2$—));
and/or a cycloaliphatic group or groups; a carbon atom or atoms forming part of a cycloaliphatic ring or rings; and/or a radical or radicals containing sulphur (e.g., a sulphide radical, a sulphoxide radical, or a sulphonyl group); and/or an ether radical or radicals; a carbonyl radical or radicals; and/or a tertiary amino radical or radicals;
R represents a hydrogen atom; a halogen atom; a nitro group; an alkyl group (e.g. a methyl group or an ethyl group); a halogenated alkyl group; an aryl group (e.g., a phenyl group or a naphthyl group); a halogenated aryl group; an aralkyl group (e.g. a benzyl group or phenyl ethyl group); a halogenated aralkyl group; an alkaryl group; a halogenated alkaryl group; a halogenated alkoxyl group; a cycloaliphatic group, a halogen and/or alkyl substituted cycloaliphatic group; or a haloalkyl substituted cycloaliphatic group;
Y represents a halogen atom, a nitro group, a R' radical or an OR' radical wherein R' has the same significance as set forth above for R;

$m$ represents an integer of from 0 to the number of replaceable hydrogen atoms on X;
$n$ represents an integer of from 0 to the number of replaceable hydrogen atoms of the aromatic nucleus or nuclei Ar;
$p$ is an integer of at least 1;
$q$ is 0 or 1, and
$r$ is 0 or an integer.

If in the diphenols according to the formula, more than one substituent Y is present, these substituents may be the same or different. This remark also applies to the substituents R and R'. The hydroxyl groups and the substituents Y of the aromatic nuclei may be in the ortho-, meta- or para-positions.

The following compounds are examples of diphenols which can be used for preparing polycarbonates according to the invention:

bis(4-hydroxyphenyl)-methane,
bis(2-hydroxyphenyl)-methane,
2,4'-bis(hydroxyphenyl)-methane,
bis(4-hydroxy-3-methylphenyl)-methane,
bis(4-hydroxy-3,5-dichlorophenyl)-methane,
bis(4-hydroxy-3,5-dibromophenyl)-methane,
bis(4-hydroxy-3,5-difluorophenyl)-methane,
bis(4-hydroxyphenyl)-ketone,
bis(4-hydroxyphenyl)-sulphide,
bis(3-hydroxyphenyl)-sulphide,
bis(4-hydroxyphenyl)-sulphone,
bis(4-hydroxyphenyl)-ether,
1,1-bis(4-hydroxyphenyl)-ethane,
2,2-bis(4-hydroxyphenyl)-propane,
2,2-bis(3-hydroxyphenyl)-propane,
2,2-bis(4-hydroxyphenyl)-butane,
2,2-bis(4-hydroxyphenyl)-(4-methyl)-pentane,
2,2-bis(4-hydroxy-3-methylphenyl)-propane,
2,2-bis(4-hydroxy-3-chlorophenyl)-propane,
2,2-bis(4-hydroxy-3,5-dichlorophenyl)-propane,
2,2-bis(4-hydroxy-3,5-dibromophenyl)-propane,
2,2-bis(4-hydroxynaphthyl)-propane,
bis(4-hydroxyphenyl)-phenylmethane,
bis(4-hydroxyphenyl)-phenylmethylmethane,
bis(4-hydroxyphenyl)-diphenylmethane,
bis(4-hydroxyphenyl)-(4-methylphenyl)-methane,
1,1-bis(4-hydroxyphenyl)-2,2,2-trichloroethane,
bis(4-hydroxyphenyl)-4-(chlorophenyl)-methane,
1,1-bis(4-hydroxyphenyl)-cyclohexane,
1,1-bis(4-hydroxyphenyl)-(3-methylphenyl)-propane,
bis(4-hydroxyphenyl)-cyclohexylmethane,
4,4'-dihydroxydiphenyl,
2,2'-dihydroxydiphenyl,
dihydroxynaphthalenes e.g., 2,6-dihydroxynaphthalene,
hydroquinone,
resorcinol,
2,6-dihydroxytoluene,
2,6-dihydroxychlorobenzene, and
3,6-dihydroxytoluene.

The dichloroformates for carrying out the process according to the present invention can be prepared from diphenols without it being necessary to purify the diphenols to a high degree. Crude diphenols can be transformed into dichloroformates and the dichloroformates can be easily purified by fractional distillation.

The process according to the invention includes one in which the aromatic dihydroxy compounds are partly replaced by aliphatic dihydroxy compounds.

As already stated the dichloroformate of the diphenol may be used as such. Moreover the polycarbonate can be prepared by adding alkali hydroxide dropwise to the dichloroformate whilst thoroughly stirring. In itself this is an important improvement; as no solvent is used the necessity for an expensive installation for recovery of the solvent is avoided. Furthermore the isolation of the polycarbonate is greatly simplified. This procedure is preferably adopted when polycarbonates are to be produced which have a relatively low molecular weight (about 20,000–40,000). In this way polycarbonate latices can be prepared directly and the polycarbonates are ready for immediate use.

Preferably, however, a solvent is present for the dichloroformate. Preference is given also to polycondensations in the presence of catalysts. Furthermore as will appear from the examples, onium catalysts, e.g., quaternary ammonium, phosphonium and arsonium compounds and tertiary sulphonium compounds are preferably used.

It is possible not only to prepare homopolycarbonates of diphenols according to the present invention but copolycarbonates of different diphenols can be prepared by using a mixture of dichloroformates of two or more different diphenols.

According to one of the previously known methods for preparing polycarbonates, an alkali salt of a dihydroxy compound is allowed to react with a dichloroformate of the dihydroxy compound in a two-phase system, whereby an alkali chloride is formed. In most cases water is used as solvent for the alkali salt. By that method it is only possible to prepare copolycarbonates of aliphatic and aromatic dihydroxy compounds, having a ratio of aliphatic to aromatic radicals of 1:1. This is due to the marked unreactivity in water of the alkali metal salts of aliphatic dihydroxy compounds as a result of which it is impossible in an aqueous medium to carry out a reaction to form a homopolymer from the alkali salt and the dichloroformate of an aliphatic dihydroxy compound.

According to the process of the present invention an alkali salt of a dihydroxy compound is not one of the initial reactants so that the above difficulty is not encountered. Furthermore by the new process it is possible to prepare copolycarbonates from diphenols and from aliphatic dihydroxy compounds in any desired ratio of the aliphatic and of the aromatic nuclei.

In many cases higher molecular weights can be obtained according to the process of the present invention than can be obtained according to the known processes. Thus it is possible to prepare a polycarbonate of 2,2-bis(4-hydroxyphenyl)-propane having an intrinsic viscosity of 3.0 dl./g. (measured at 25° C. in sym.-tetrachloroethane) which value has never been reached as far as we are aware, hitherto.

A great advantage of the new process is that high molecular weight colourless polycarbonates can be obtained even when starting from dichloroformates which have been prepared from unpurified diphenols.

The invention includes, polycarbonates prepared by the new process. Polycarbonates prepared according to the invention not only have useful film-forming properties but can also be used for forming other shaped articles and the invention includes films and other articles formed from polycarbonates prepared by the new process. More particularly the colourless polycarbonates of the invention can be used for the manufacture of photographic film base.

The following examples illustrate the process of the invention. The intrinsic viscosity values [$\eta$] were measured in sym.-tetrachloroethane at 25° C.

*Example 1*

To a solution of 7.064 g. of bischloroformate of 2,2-bis(4-hydroxyphenyl)-propane and 40 mg. of triethylbenzylammonium chloride in 40 cm.$^3$ of methylene chloride are dropwise added over 5 min. at 10° C. whilst thoroughly stirring, 82 cm.$^3$ of N sodium hydroxide. After stirring the reaction mixture for 6 hr. at room temperature, the resulting highly viscous polymer solution is washed three times with 100 cm.$^3$ of water and poured into hot water. The precipitated polycarbonate of 2,2-bis(4-hydroxyphenyl)-propane is dried at 110° C., [$\eta$]=3.0 dl./g.

Films cast from solutions of this polycarbonate in chlorinated hydrocarbons have the following properties:

| | |
|---|---:|
| Softening point °C | 140–150 |
| Modulus of elasticity kg./mm.² | 230 |
| Tensile strength kg./mm.² | 6.1 |
| Yield strength kg./mm.² | 6.2 |
| Elongation percent | 73.5 |

Example 2

Example 1 is repeated but 40 mg. of triethylbenzylammonium chloride are replaced by 40 mg. of triphenylbenzylphosphonium chloride. $[\eta]$ of the obtained polycarbonate: 1.3 dl./g.

Example 3

To a solution of 7.064 g. of bischloroformate of 2,2-bis(4-hydroxyphenyl)-propane and 40 mg. of triphenylmethylarsonium iodide are dropwise added over 5 min. at 10° C. whilst thoroughly stirring, 82 cm.³ of N sodium hydroxide. After stirring the reaction mixture for 6 hr. at room temperature, the resulting highly viscous polymer solution is washed three times with 100 cm.³ of water and poured into hot water. The precipitated polycarbonate of 2,2-bis(4-hydroxyphenyl)-propane is dried at 110° C., $[\eta]=1.33$ dl./g.

In the next three examples the influence is examined of the molar ratio of the amounts of bischloroformate and sodium hydroxide which are present in the reaction.

Example 4

To a solution of 10.596 g. of bischloroformate of 2,2-bis(4-hydroxyphenyl)-propane (0.03 mol) and 60 mg. of triphenylbenzylphosphonium chloride in 60 cm.³ of methylene chloride are dropwise added over 5 min. at 10° C. whilst thoroughly stirring 122 cm.³ of N sodium hydroxide (0.12 mol+2% of excess). After stirring the reaction mixture for 6 hr. at room temperature, the polymer solution is washed three times with 100 cm.³ of water and poured into hot water. The precipitated polycarbonate is dried at 110° C., $[\eta]=0.74$ dl./g.

Example 5

Example 4 is repeated but only 92 cm.³ of N sodium hydroxide (0.09 mol+2% of excess) are added to the solution. $[\eta]$ of the resulting polycarbonate: only 0.08 dl./g.

Example 6

Example 4 is repeated but only 61.5 cm.³ of N sodium hydroxide (0.06 mol+2% of excess) are added to the solution. $[\eta]$ of the resulting polycarbonate: only 0.02 dl./g.

Example 7

To a solution of 8.07 g. of bischloroformate of p-(dihydroxymethyl) cyclohexane (75 mol percent), 3.532 g. of bischloroformate of 2,2-bis(4-hydroxyphenyl)-propane (25 mol percent) and 40 mg. of triethylbenzylammonium chloride in 40 cm.³ of methylene chloride, is dropwise added over 5 min. at 10° C., whilst thoroughly stirring a solution of 6.6 g. of sodium hydroxide in 70 cm.³ of water. By stirring for a further hour at 5° C. the reaction mixture becomes very viscous. When stirring still longer the viscosity decreases markedly. After 3 hr. of stirring the polymer solution is washed three times with 100 cm.³ of water and poured into ethanol, wherein the polymer becomes very sticky and appears to depolymerise still further. For that reason the polycarbonate is immediately brought in water and then vacuum-dried. $[\eta]=0.44$ dl./g.

Example 8

To a solution of 7.064 g. of bischloroformate of 2,2-bis(4-hydroxyphenyl)-propane (33 mol percent), 7.480 g. of bischloroformate of ethyleneglycol (67 mol percent) and 80 mg. of triethylbenzyl ammonium chloride in 20 cm.³ methylene chloride, is dropwise added over 5 min. at 0° C. whilst thoroughly stirring a solution of 9.6 g. of sodium hydroxide in 100 cm.³ of water. After stirring the reaction mixture for 6 hr. between 0 and 10° C., the methylene chloride solution is washed three times with 100 cm.³ of water and the polycarbonate is obtained by pouring the solution into ethanol. $[\eta]=0.43$ dl./g.

Example 9

To a solution of 3.532 g. of bischloroformate of 2,2-bis(4-hydroxyphenyl)-propane, 4.910 g. of bischloroformate of 2,2-bis(4-hydroxy-3,5-dichlorophenyl)-propane and 40 mg. of triphenylbenzylphosphonium chloride in 40 cm.³ of methylene chloride are dropwise added over 5 min. at 10° C. whilst thoroughly stirring 82 cm.³ of N sodium hydroxide. After stirring this reaction mixture for 20 hrs. at room temperature, the resulting polymer solution is washed twice with 100 cm.³ of water and poured into hot water. The precipitated polycarbonate is dried at 110° C. $[\eta]=0.8$ dl./g.

Example 10

To a solution of 0.941 g. of bischloroformate of hydroquinone (20 mol percent), 5.651 g. of bischloroformate of 2,2-bis(4-hydroxyphenyl)-propane (80 mol percent) and 40 mg. of triphenylbenzylphosphonium chloride in 40 cm.³ of methylene chloride, which solution is thoroughly stirred under nitrogen atmosphere, are dropwise added over 5 min. at 10° C., 82 cm.³ of N sodium hydroxide. After stirring the reaction mixture for 3 hr. at room temperature, the resulting highly viscous polymer solution is washed three times with water and poured into hot water. The precipitated polymer is dried at 110° C. $[\eta]=0.4$ dl./g.

Example 11

16 g. of bischloroformate of a mixture of isomeric bis-(hydroxyphenyl)-methanes which is composed of 42.8% of bis(4-hydroxyphenyl)-methane, 44.6% of 2,4'-bis(hydroxyphenyl)-methane and 12.6% of bis(2-hydroxyphenyl)-methane are boiled for 2 hrs. with a solution of 8 g. of sodium hydroxide in 50 cm.³ of water. The bischloroformates are gradually transformed into a tough polymeric mass which is washed three times with 100 cm.³ of water and dried at 80° C. $[\eta]=0.43$ dl./g.

Example 12

In a three-necked flask of 250 cm.³ fitted with a stirrer, a thermometer and a dropping funnel, 4.8 cm.³ of bischloroformate of a mixture of isomeric bis(hydroxyphenyl)-methanes which is composed of 55% of bis(4-hydroxyphenyl)-methane and 45% of 2,4'-bis(hydroxyphenyl)-methane and 40 mg. of triethyl benzyl ammonium chloride are dissolved in 40 cm.³ of methylene chloride.

To the solution which is thoroughly stirred are dropwise added over 5 min. at 10° C. 85 cm.³ of N sodium hydroxide. After stirring the mixture for 6 hrs. at room temperature the polymer solution is washed with water and poured into ethanol. The precipitated polymer is dried. $[\eta]=0.44$ dl./g.

Example 13

Example 12 is repeated but the mixture is stirred for 20 hrs. at room temperature instead of for 6 hrs. $[\eta]=1.5$ dl./g.

We claim:

1. Process for the preparation of polycarbonates comprising reacting a dihalogenoformate of a diphenol with an alkali metal hydroxide, said hydroxide being present in an amount having a molar ratio to the amount of said dihalogenoformate of at least about 4:1.

2. Process for the preparation of polycarbonates according to claim 1 wherein the alkali metal hydroxide is sodium hydroxide.

3. Process for the preparation of polycarbonates according to claim 1, wherein the dihalogenoformate of a diphenol is a dicholorformate of a diphenol.

4. Process for the preparation of polycarbonates according to claim 1, wherein the diphenol corresponds to the formula:

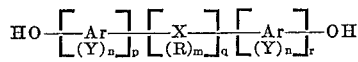

wherein:
Ar represents a carbocyclic aromatic nucleus,
X represents a radical selected from the group consisting of an alkylene group, an alkylidene group, a cycloaliphatic group, a carbon atom forming part of a cycloaliphatic ring, a radical containing sulphur, an ether radical, a carbonyl radical, at least two groups selected from alkylene and alkylidene bonded together by at least one radical from the group consisting of an aromatic radical, a cycloaliphatic group, a carbon atom forming part of a cycloaliphatic ring, an ether radical, a carbonyl radical, a radical containing sulfur,
R is selected from the group consisting of a hydrogen atom, a halogen atom, an alkyl group, a halogenated alkyl group, an aryl group, a halogenated aryl group, an aralkyl group, a halogenated aralkyl group, an alkaryl group, a halogentated alkaryl group, a cycloaliphatic group, a halogen substituted cycloaliphatic group, an alkyl substituted cycloaliphatic group and a haloalkyl substituted cycloaliphatic group,
Y is selected from the group consisting of a halogen atom and a R' radical wherein R' has the same significance as set forth above for R,
$m$ represents an integer of from 0 to the number of replaceable hydrogen atoms of the aromatic nucleus Ar,
$p$ is an integer of at least 1,
$q$ is selected from 0 and 1, and
$r$ is selected from 0 and an integer.

References Cited by the Examiner

UNITED STATES PATENTS

| | | | |
|---|---|---|---|
| 2,587,437 | 2/1952 | Bralley et al. | 260—47 |
| 2,970,131 | 1/1961 | Moyer et al. | 260—47 |
| 3,028,365 | 4/1962 | Schnell et al. | 260—47 |
| 3,193,528 | 7/1965 | Miller et al. | 260—47 |

SAMUEL H. BLECH, *Primary Examiner.*

WILLIAM H. SHORT, *Examiner.*

C. A. WENDEL, *Assistant Examiner.*